United States Patent
Nemeth et al.

(10) Patent No.: US 11,176,829 B2
(45) Date of Patent: Nov. 16, 2021

(54) SYSTEM AND METHOD FOR OPERATING AUTONOMOUSLY DRIVING UTILITY VEHICLES

(71) Applicant: KNORR-BREMSE SYSTEME FUER NUTZFAHRZEUGE GMBH, Munich (DE)

(72) Inventors: Huba Nemeth, Budapest (HU); Csaba Horvath, Biatorbagy (HU); Tamas Rapp, Budapest (HU); Simon Felipe Duque Velez, Budapest (HU)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 273 days.

(21) Appl. No.: 16/329,296

(22) PCT Filed: Aug. 16, 2017

(86) PCT No.: PCT/EP2017/070728
§ 371 (c)(1),
(2) Date: Feb. 28, 2019

(87) PCT Pub. No.: WO2018/046259
PCT Pub. Date: Mar. 15, 2018

(65) Prior Publication Data
US 2019/0251846 A1 Aug. 15, 2019

(30) Foreign Application Priority Data
Sep. 8, 2016 (DE) .................. 10 2016 116 860.2

(51) Int. Cl.
*G08G 1/00* (2006.01)
*G06Q 10/08* (2012.01)
(Continued)

(52) U.S. Cl.
CPC ............ *G08G 1/202* (2013.01); *G05D 1/0022* (2013.01); *G06Q 10/08* (2013.01); *B60W 10/04* (2013.01);
(Continued)

(58) Field of Classification Search
CPC ........ G08G 1/202; G06Q 10/08; B60W 10/04; G05D 2201/02
See application file for complete search history.

(56) References Cited

U.S. PATENT DOCUMENTS

| | | | |
|---|---|---|---|
| 7,769,644 B2 | 8/2010 | Naghshiineh et al. |
| 8,825,261 B1 | 9/2014 | Szybalski et al. |

(Continued)

FOREIGN PATENT DOCUMENTS

| | | |
|---|---|---|
| DE | 10322824 A1 | 12/2004 |
| DE | 10322765 A1 | 1/2005 |

(Continued)

OTHER PUBLICATIONS

International Search Report dated Mar. 4, 2018, of the corresponding International Application PCT/EP2017/070728 filed Aug. 16, 2017.

*Primary Examiner* — Thomas G Black
*Assistant Examiner* — Tarek Elarabi
(74) *Attorney, Agent, or Firm* — Norton Rose Fulbright US LLP; Gerard Messina; Aaron Deditch

(57) ABSTRACT

A system for operating an autonomously driving commercial vehicle in a restricted area, including: a vehicle interface module to provide an interface for the vehicle, wherein the restricted area has an entrance, an exit and at least one destination where an action is performable on the commercial vehicle; a driver interface module to provide a communication interface for a driver; and an operator interface module to provide a communication interface for an opera- (Continued)

tor of the restricted area; in which the vehicle interface module, the driver interface module and the operator interface module are configured to exchange information with one another. Also described are a related management system, a method and a computer readable medium.

15 Claims, 3 Drawing Sheets

(51) Int. Cl.
  *G05D 1/00* (2006.01)
  *G06Q 50/30* (2012.01)
  *B60W 10/04* (2006.01)
(52) U.S. Cl.
  CPC . *B60W 2300/12* (2013.01); *G05D 2201/0212* (2013.01); *G06Q 50/30* (2013.01)

(56) References Cited

U.S. PATENT DOCUMENTS

| | | |
|---|---|---|
| 8,903,592 B1 | 12/2014 | Mariet et al. |
| 2002/0022983 A1 | 2/2002 | Barton |
| 2004/0267411 A1* | 12/2004 | Mayer ................. G05D 1/0297 701/1 |
| 2005/0216553 A1 | 9/2005 | Mallonee et al. |
| 2011/0130962 A1 | 6/2011 | Lindsey |
| 2012/0246039 A1 | 9/2012 | Fain et al. |

FOREIGN PATENT DOCUMENTS

| | | |
|---|---|---|
| DE | 102004037707 A1 | 2/2006 |
| DE | 102008055881 A1 | 5/2010 |
| DE | 102012015968 A1 | 3/2014 |
| DE | 102014011796 A1 | 2/2016 |
| DE | 102015216881 A1 | 3/2017 |

\* cited by examiner

SYSTEM AND METHOD FOR OPERATING AUTONOMOUSLY DRIVING UTILITY VEHICLES

FIELD OF THE INVENTION

The present invention relates to a system and a method for operating autonomously driving commercial vehicles and in particular to an autonomous management system and user interfaces.

BACKGROUND INFORMATION

Autonomous operation of commercial vehicles is an area that is gaining increasing interest, but the technical complexity for autonomous systems is high. On the other hand, in restricted areas (e.g. cargo terminals, loading stations or other restricted-access areas), potential faults are more manageable. Thus, autonomous systems can be implemented more easily there. By way of example, speeds in such areas can be kept down and only a particular group of people can be granted access. Nevertheless, a management system is normally required for the autonomous operations, in order to ensure safe operation and monitoring of autonomously driving vehicles or vehicle systems.

Already understood systems for autonomously operating vehicles normally relate to passenger vehicles (PVs), but not to autonomous systems for operating commercial vehicles in a restricted area. DE 10 2014 011 796 A1 discusses for example a system for connecting an autonomous area to vehicles in order to provide the vehicles with data as assistance for navigation in the area. Additionally, U.S. Pat. No. 8,816,610 B1 discusses a system having a user interface for indicating an internal state of an autonomous driving system. A control computer in this case sends messages to different systems of the vehicle in order to safely maneuver the vehicle to the destination. Information on an electrical display provides the passengers with a way of understanding the pending actions for the vehicle. Further conventional systems are discussed in U.S. Pat. No. 8,903,592 B1 and U.S. Pat. No. 8,825,261 B1.

Although these systems may afford advantages for PVs, they are of lesser interest for commercial vehicles or require the presence of the driver. In particular for autonomous operation in areas where distinctly as few people as possible are meant to be present (e.g. for safety reasons), the known systems provide only inadequate solutions.

There is thus a need for systems for operating commercial vehicles that solve the aforementioned problems.

SUMMARY OF THE INVENTION

At least some of the aforementioned problems may be solved by a system and a method for operating an autonomously driving commercial vehicle as described herein. The further descriptions herein define further advantageous embodiments of the subjects according to the descriptions herein.

The present invention relates to a system for operating an autonomously driving commercial vehicle in a restricted area, wherein the restricted area has an entrance, an exit and at least one destination where an action is performable on the commercial vehicle. The system comprises a vehicle interface module, a driver interface module and an operator interface module. The vehicle interface module provides an interface for the vehicle. The driver interface module provides a communication interface for the driver. The operator interface module provides a communication interface for the operator of the restricted area. The vehicle interface module, the driver interface module and the operator interface module are configured to exchange information with one another.

By way of example, the vehicle interface module, the driver interface module and the operator interface module, which, for the sake of simplicity, are subsequently also referred to simply as interface modules, can for this purpose be particular electronic devices, or can be integrated in such devices. At least some of these interfaces can be controllers that are configured, as a result of installed software, to perform the applicable functions. The operator can be a person or else a system (e.g. a management system) that can control and monitor the restricted area and all activities therein. The operator can likewise be implemented as a suitable software product in order to perform the applicable tasks automatically.

The restricted area can be for example a loading terminal (for loading and unloading commercial vehicles) or a cargo terminal, a bus terminal or else a ferry, a railway loading station (in order to load the whole commercial vehicle), an aircraft and more besides.

The vehicle interface module is an interface for the commercial vehicle in order to use it to control the commercial vehicle (e.g. accelerating, braking, steering) or to read sensor data from the commercial vehicle. The driver interface module can provide particular functions and/or information.

The term "actions" is intended to be understood within the context of the present invention to mean all activities with or around a commercial vehicle. This comprises for example autonomous driving (accelerating, braking, steering), loading, unloading, washing, refueling, charging batteries, etc.

The driver interface module is for example configured to provide at least one of the following functions:
  setting up a connection to the operator (e.g. when a radio infrastructure of the area has been detected),
  performing a handover of the vehicle from the driver to the operator (e.g. when a connection to the radio infrastructure has been set up or the operator interface module has made a request);
  performing a separation from the operator only when the driver has taken responsibility for the vehicle (e.g. after an optional acknowledgement),
  informing and advising the driver of the commercial vehicle of an actual delivery status (e.g. based on cargo restrictions, an availability of target cargo terminals and other parameters) in order to help the driver to optimize a speed of transfer,
  receiving/sending a message from/to further subscribers connected to the area infrastructure.

The handover of responsibility for the vehicle can be accomplished using physical or software-implemented switching elements (switches, buttons, sliders, etc.). The sending of messages can be accomplished for example using communication software, SMS, e-mail or other push communication arrangement, in particular in wireless form.

Optionally, the driver interface module is further configured to provide information about at least one of the following topics:
  an availability of known infrastructures of the area (e.g. the vehicle interface module),
  a connection status to an area infrastructure from the vehicle interface module and/or the driver interface module, identification of a responsibility for the commercial vehicle, a probable completion time for the action on the commercial vehicle, an envisaged position of the commercial vehicle for returning responsibility for the commercial vehicle to the driver, a load and instructions for a successful delivery, in particular about an intended delivery time and about an estimated delivery time, actions that have been performed during autonomous driving, in particular period in the restricted area, period at the loading stations or other destinations traveled to by the commercial vehicle, waiting times since loading finished, errors that have occurred, dangerous situations that have occurred during autonomous operation, or events during an acceptance or handover and status information for the vehicle.

An employee with a personal interface module can work in the restricted area and at least one of the interface modules (i.e. the vehicle interface module or the driver interface module or the operator interface module) can be configured to set up a connection to the personal interface module in order to contact the employee.

The personal interface module can again provide particular functions and/or information.

The personal interface module is for example configured to provide at least one of the following functionalities:

permitting the employee to start, interrupt or complete an action on an available commercial vehicle, in particular by using a physical or software-implemented switch or button, requesting more time to complete an action if the action is not completable in a predetermined time frame defined by the operator, in particular by using a physical or software-implemented switch or button, return of the commercial vehicle to the operator in order to initiate further autonomous actions, receiving/sending messages from/to further subscribers connected to the area infrastructure, allowing tracking of each cargo part, in particular when the personal interface is integrated into an operator system (e.g. management system), using an individual cargo identification (e.g. a barcode or QR code or by other arrangement), uploading of cargo information (e.g. about loading or unloading) to the operator of the restricted area (e.g. together with the individual cargo identification).

Additionally, the personal interface module can optionally be configured to provide information about at least one of the following topics:

a list of employees available for an action, who perform an action or have completed an action, target times (e.g. for completion of the actions) for each vehicle on which actions are being performed, a connection state to the area infrastructure, wherein the connection state is provided to the vehicle interface module and/or to the driver interface module, load to be loaded onto or unloaded from the vehicle, in particular with an indication of a source, a destination and/or of special instructions.

Similarly, the operator interface module can provide particular functions and/or information.

The operator interface module is for example configured to provide at least one of the following functions:

providing connections to the commercial vehicle, the driver interface module and/or the employee control interface module, permitting or performing a manual or automatic handover of responsibility for the commercial vehicle, allowing a manual definition or the performance of an automatic definition of destinations for the autonomous commercial vehicle, allowing download of cartographic data of the restricted area and production and download of an optimum routing to destinations for the autonomous commercial vehicle, allowing setting of a manual target time or production of an automatic target time for each condition of the action on the vehicle, allowing manual or automatic starting and ending of actions on the commercial vehicle, handling of information obtained from the personal interface module of the employee in order to update the vehicle state and an elapsed and a remaining period for each vehicle in the restricted area, allowing a manual or automatic handover of responsibility for the commercial vehicle to the driver on a request from the driver, permitting sending and receiving of messages from subscribers connected to the area infrastructure.

The destinations can be for example loading stations, storehouses, parking spaces, car washes, towing vehicles or other locations in the restricted area.

A condition of the action (action state) can be determined for example by at least one of the following properties: whether the vehicle is connected to a network, is moving, is stationary, is being loaded or unloaded, is waiting for a driver or an error has occurred. The information on the actual cargo can comprise for example a priority, a validity, the type of cargo (e.g. animals, perishable food and other things).

Furthermore, the operator interface module is optionally configured to provide information about at least one of the following topics:

a connection state of each vehicle within the restricted area, an operating state of each vehicle in the restricted area, a position and direction of each vehicle on a graphical map of the restricted area, sensor signals transmitted by the vehicle that relate to an overview and/or a front view and/or another perspective, a series or order of destinations for each vehicle, an elapsed and a probably remaining time and a finishing time at a destination for an action for the vehicle in the restricted area, an actual cargo of each directly or indirectly controlled vehicle.

Optionally, the system comprises an arrangement in order to share information about a cargo that has been loaded or unloaded with other restricted areas or to exchange said information with another cargo management system via further interfaces.

Optionally, the driver interface module is integrated with global navigation software in order to allow continuous renewal of the probable delivery time for cargo.

Optionally, the driver interface module is configured to perform an Internet-based communication with target cargo terminals while the vehicle with the cargo is moving in order to achieve optimization for the flow of cargo at the target cargo terminals.

Optionally, the interface modules (e.g. the vehicle interface module, the driver interface module and the operator interface module) comprise at least one of the following components or are contained therein: a computer unit, a cellphone, a tablet, a mobile electronic device and a radio network unit (e.g. based on Bluetooth or GSM) configured to cover at least the restricted area.

The present invention also relates to a (centralized) management system having one or more systems as have been defined above, a cargo management and an interface for a monitoring person. The management system is configured to provide at least one of the following functions:

automatically determining destinations, based on the precise flow of cargo and the location of a given cargo terminal, so as to optimize the time that a commercial vehicle spends at a cargo terminal, providing information on the interface(s) in order to monitor multiple restricted areas, including commercial vehicles autonomously operating therein, by the monitoring person.

An advantage of these systems is that they also allow the size of the restricted areas and the costs of the cargo at the terminal to be optimized.

The present invention also relates to a method in which the described functions are performed or the information is provided.

This method or at least parts of it can likewise be implemented or stored in the form of instructions in software or on a computer program product, stored instructions being capable of performing the steps according to the method when the method runs on a processor (e.g. one of the vehicle control units). Thus, the present invention likewise relates to a computer program product having software code (software instructions) stored thereon that is configured to perform one of the methods described above when the software code is executed by a processing unit. The processing unit can be any form of computer or control unit and can likewise comprise the described control module or the warning module controller, which have an appropriate microprocessor that can execute a software code.

Exemplary embodiments provide a solution for efficient management of autonomously operated commercial vehicles in a restricted area, specifically by a system of at least three players: a vehicle, a driver and an operator, with optionally at least a loading worker (employee) being able to be integrated in the system by his own interface. The at least three players are connected to one another using the area infrastructure or via the Internet.

Exemplary embodiments afford the following advantages on top of this:

When vehicles are operated autonomously, continuous manual monitoring is not required, for example. Additionally, cargo flow management is an area that already has a good level of understanding in logistics systems. Employees who can perform manual activities, for example, are required only for actions that require a manual interaction. In the case of highly automated areas, however, most actions require no manual help. As such, actions such as for example washing, refueling, automatically loading tankers or special towing vehicles/trailers, etc., are performable without employees performing manual actions. Thus, such activities can likewise be undertaken by applicable control modules/ automatons or computers generally that act as automated employees or players.

Exemplary embodiments additionally permit transparent switching of the control between different subscribers of the autonomous system of the restricted area, while responsibility for the commercial vehicle always remains clearly regulated.

In contrast to the known systems, exemplary embodiments do not just use the communication between players or downloaded maps. Rather, the actions of the individual players in their environment and their precise tasks are defined with such precision that exemplary embodiments are applicable to any fields of application. The required functions are associated with the players in order to achieve highly automated and optimized management.

Additionally, exemplary embodiments also afford the advantage over the known systems that a driver or other persons is not required or permitted to remain in the vehicle cab, but rather all information required for the external players is explicitly assigned in order to be able to take control over the autonomously operating commercial vehicle and to monitor the applicable internal states.

The explicit association of functions and information (i.e. who provides what function or information) permits exemplary embodiments to achieve the aforementioned safety and efficiency of the autonomous system. Misunderstandings about who is responsible for what are therefore ruled out.

The exemplary embodiments of the present invention will be better understood from the detailed description that follows and the accompanying drawings of the different exemplary embodiments, which, however, should not be understood as limiting the disclosure to the specific embodiments, but rather merely serve for explanation and comprehension.

DETAILED DESCRIPTION

Figure 1:
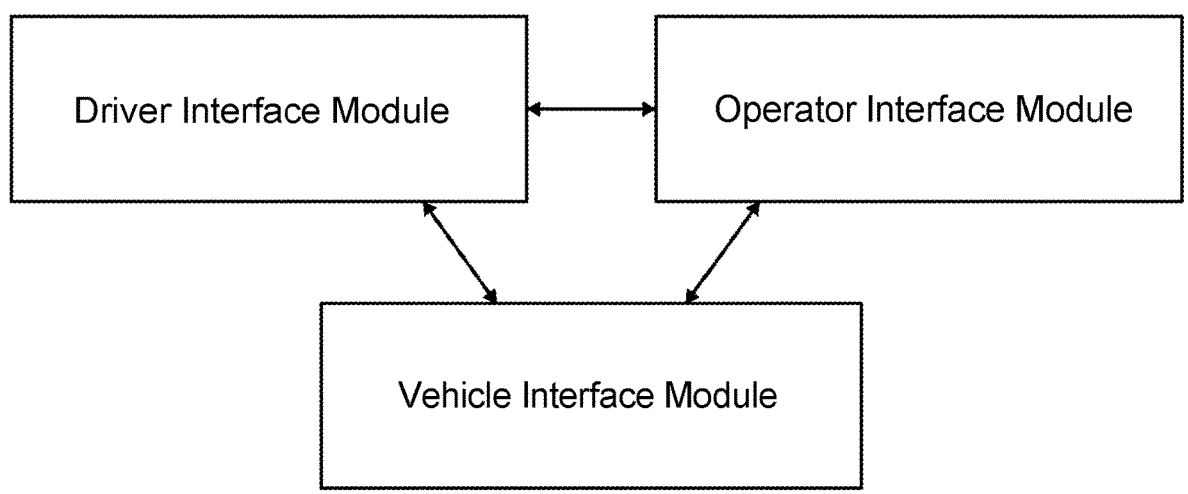
FIG. 1 shows an exemplary embodiment of a system for operating an autonomously driving commercial vehicle in a restricted area.

FIG. 1 shows an exemplary embodiment of a system suitable for operating autonomously driving vehicles in a restricted area. The restricted area comprises an entrance, an exit and at least one destination where handling on the commercial vehicle is performable. The system comprises a vehicle interface module 110 providing an interface for the vehicle, a driver interface module 120 providing a communication interface for the driver and an operator interface module 130 providing a communication interface for the operator of the restricted area. The vehicle interface module, the driver interface module and the operator interface module are configured to exchange information with one another.

The interface modules 110, 120, 130 shown can be connected to one another via an existing network (e.g. intranet, Internet, etc.). However, it is likewise possible for the interface modules 110, 120, 130 to connect to form an ad hoc network as required and to exchange information. When the actions on the commercial vehicle have finished and when the commercial vehicle has left the restricted area, these network connections can be broken again. When a new commercial vehicle enters the restricted area, a temporary network structure can be set up again.

Figure 2:
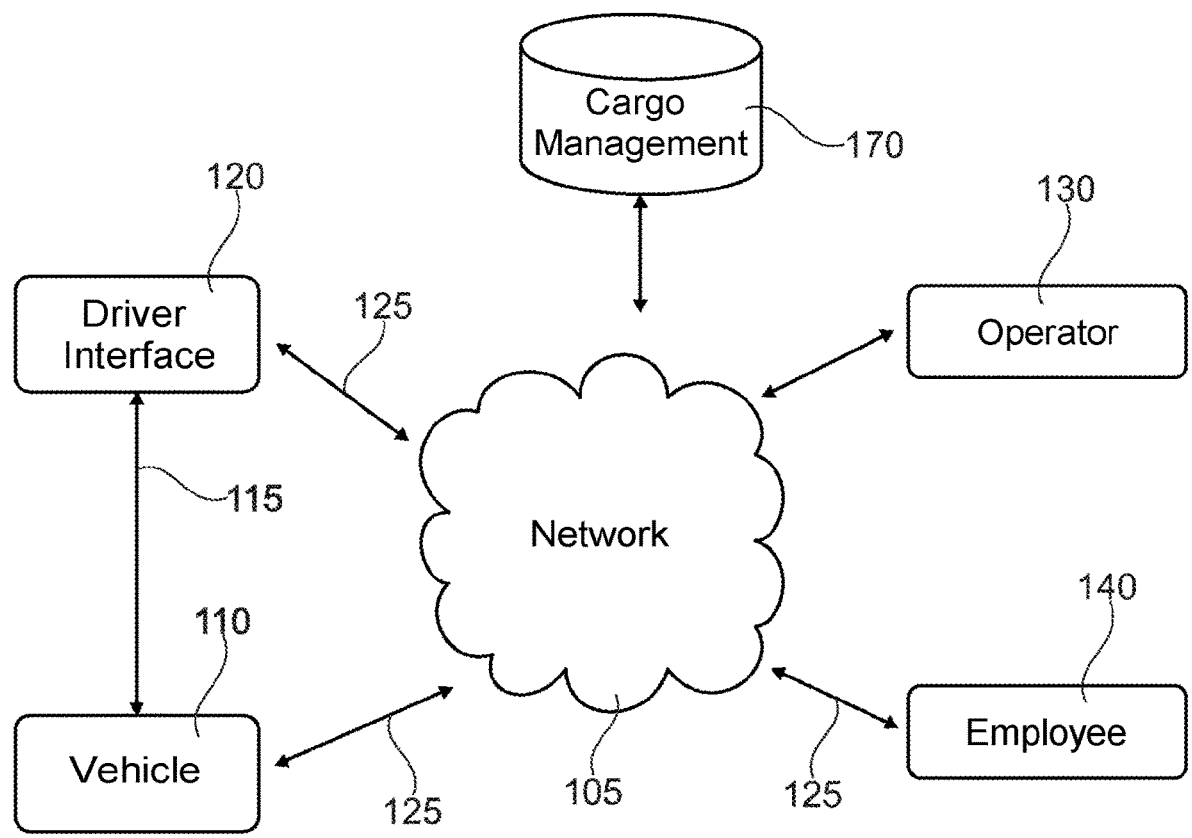
FIG. 2 shows an exemplary embodiment of a management system for a restricted area.

FIG. 2 shows an exemplary embodiment of a management system for a restricted area, wherein the vehicle interface module 110, the driver interface module 120 and the operator interface module 130 are connected to one another via a network 105 (e.g. intranet, Internet or another network structure). Additionally, the vehicle interface module 110, the driver interface module 120 and the operator interface module 130 are connected to an optional personal interface module 140 of an employee. To this end, connections 125 from the individual modules to the network 105 are set up. The connections 125 can be set up for example by a wireless, optionally encrypted (via at least one channel), communication between the modules.

Optionally, the vehicle interface module 110 and the driver interface module 120 are additionally connected to one another via a local network connection 115 such as for example Bluetooth or WLAN. A local network connection of this kind is likewise possible between the other components (not shown). Furthermore, in the exemplary embodiment of FIG. 2, a cargo management 170 is shown, which likewise has an associated interface in order to communicate with the vehicle interface module 110 and/or the driver interface module 120 and/or the operator interface module 130 via the network 105.

In further exemplary embodiments, the personal interface module 140 of the further employee is configured to be integrated into the management system so as to allow the tracking of each cargo part using an individual goods identification (e.g. a barcode or QR code or by other arrangements). The interface module 140 of the employee can forward all cargo loading and unloading information to the operator of the restricted area.

The system shown in FIG. 2 is therefore in particular an architecture (area infrastructure) for a single local management system. In such a system, all players (e.g. the vehicle, the driver, the operator and the employee) communicating with one another to operate the restricted area are connected to one another via the local (wireless) network 105. Additionally, it is possible for only these players to have access to the network 105. Optionally, the management system can also operate and be receivable only locally in the restricted area.

Figure 3:
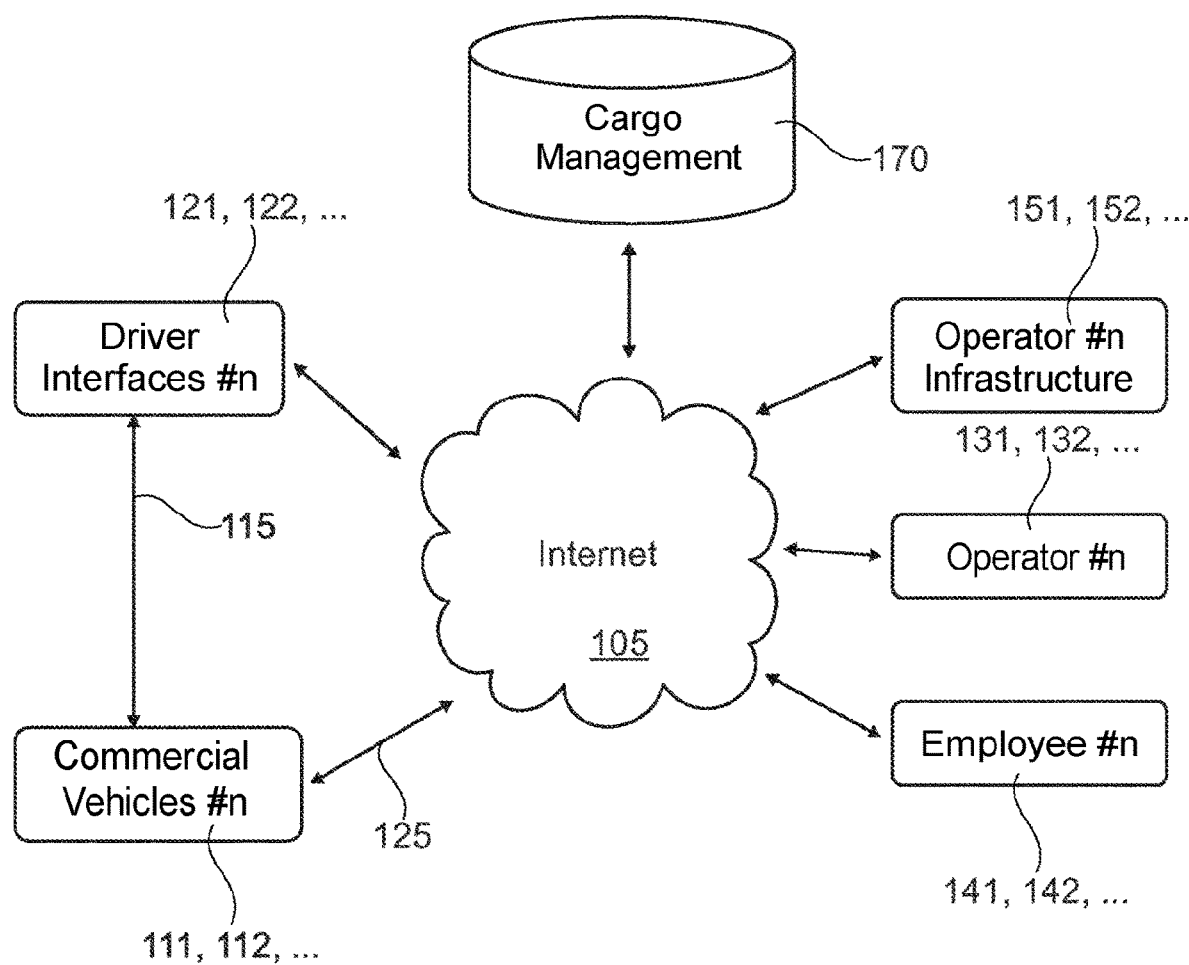
FIG. 3 shows a further exemplary embodiment of a possible system architecture that comprises multiple restricted areas.

FIG. 3 shows a further exemplary embodiment of a possible system architecture that has multiple systems (e.g. for multiple restricted areas). The connection between the players can in this case be made via the Internet 105 or another wide area network (WAN).

In the exemplary embodiment shown, a separate interface module can be produced for each vehicle, for each driver and for each management system. As such, the exemplary embodiment comprises a multiplicity of vehicle interface modules 111, 112, . . . , a multiplicity of driver interface modules 121, 122, . . . and a multiplicity of operator interface modules 131, 132, . . . , all of which are connected to one another via the network 105. Optionally, employees again work in the restricted areas, who likewise have a multiplicity of personal interface modules 141, 142, . . . . On top of that, multiple area infrastructures 151, 152, . . . are connected to other subscribers of the system via the network 105. As in FIG. 2 too, the system of FIG. 3 comprises a cargo management 170 that is connected to all players.

Access by the players to the network 105 can again be effected via connections 125 that can again provide encrypted, in particular wireless, communication channels. The connection between the individual drivers and vehicles can be made via local Bluetooth or WLAN network connections 115, which can be provided by the vehicles, for example.

An advantage of the architecture shown lies in the centralization of the management systems and its functions. Thus, there is the option of monitoring multiple restricted areas (e.g. cargo terminals), including the commercial vehicles autonomously operated at the individual cargo terminals, by a single person. This additionally allows costs to be lowered, and deliveries can be optimized. By way of example, remote (or external) operator management systems can be provided with the option of accessing global cargo information in the cargo management 170 and of using said information for optimization.

The exemplary embodiments shown provide the autonomous operation only in the restricted area(s), for example, which means that an adequate infrastructure and technical equipment can be ensured for the operation of commercial vehicles. To this end, the players perform in particular the following functions, for which purpose the interface modules are used:

When the commercial vehicle enters the restricted area and the area supports autonomous operation, the possible autonomous mode can be transparently made available as an option for switching on. By way of example, this can be indicated to the driver on his interface module 120, so that he is able to connect to the infrastructure of the restricted area by using a suitable management system.

According to exemplary embodiments, to this end the driver can request a handover of the vehicle when entering the restricted area. An appropriate remote station on the management side (operator) can then take responsibility for the vehicle from the driver. After this action, the autonomous vehicle mode is activated and the driver no longer has responsibility for the vehicle.

According to exemplary embodiments, the operator can define target positions (e.g. loading stations, parking spaces or the like) and automatically navigate the commercial vehicle thereto. Additionally, the operator can stop and restart the commercial vehicle. This can be required for safety reasons, for example. Additionally, the operator can continuously monitor the vehicle state and the surroundings.

Since it can be a more frequent occurrence that different commercial vehicles operate in the restricted area, the operator can monitor and control all commercial vehicles.

When a commercial vehicle has reached its destination, a particular loading or unloading process can be performed. This can be accomplished for example by an employee (a person) who is authorized by the system to carry out the applicable work. By way of example, the employee can take care of the loading of one or more commercial vehicles. When an exemplary unloading or loading process has finished, the employee can inform the operator of this (e.g. that a particular commercial vehicle has finished the action at a particular loading station). Optionally, the employee's work can also be undertaken by a machine (robot).

When finally all actions in the restricted area have finished, the driver can take back responsibility for the vehicle, switch off the autonomous mode and drive the vehicle away from the restricted area.

The integration of intelligent autonomous vehicle management systems of this kind (as in FIG. 3) with a cargo management system 170 likewise allows accurate tracking and planning of valuable goods, while cargo operating hours and costs for the commercial vehicles can be reduced. Valuable and expensive human resources thus do not need to be used for the autonomous functions.

Optionally, the system can determine the destinations automatically, e.g. based on the precise flow of cargo and the location of a given cargo terminal. As a result, it is possible to achieve a further optimization of the time that a commercial vehicle spends at a cargo terminal. Similarly, the time that a particular cargo spends at a cargo terminal and possibly also the size of the restricted areas and the costs of the cargo at the terminal can be optimized.

In further exemplary embodiments, the vehicle interface module 110 is configured to advise the driver of the commercial vehicle of the actual delivery status (for example based on cargo restrictions, the availability of target cargo terminals and other parameters) in order to select an optimized speed of transfer.

The features of the invention that are disclosed in the description, the claims and the figures can be essential to the implementation of the invention either individually or in any combination.

THE LIST OF REFERENCE SIGNS IS AS FOLLOWS

105 Network
110 (111, 112, . . . ) Vehicle interface module
120 (121, 122, . . . ) Driver interface module
130 (131, 132, . . . ) Operator interface module
140 (141, 142, . . . ) Personal interface module
151, 152 Area infrastructures
170 Cargo management

The invention claimed is:

1. A system for operating an autonomously driving commercial vehicle in a restricted area, comprising:
a vehicle interface module to provide an interface for the vehicle, wherein the restricted area has an entrance, an exit and at least one destination where an action is performable on the commercial vehicle;
a driver interface module to provide a communication interface for a driver; and
an operator interface module to provide a communication interface for an operator of the restricted area;
wherein the vehicle interface module, the driver interface module and the operator interface module are configured to exchange information with one another,
wherein the driver interface module and the operator interface module are connected to one another via a network,
wherein the vehicle interface module, the driver interface module and the operator interface module are connected via the network to a personal interface module of an employee,
wherein connections are set up from each of the modules to the network, and wherein the connections are set up by a wireless, encrypted via at least one channel, communication among each of the modules,
wherein the driver interface module is configured to receive/send a message from/to further subscribers connected to an area infrastructure, and
wherein the driver interface module is configured to provide information about actions that have been performed during autonomous driving, a period in the restricted area, a period at the loading station or other destination traveled to by the commercial vehicle, a waiting time since loading finished, an error that occurred, a dangerous situation that occurred during autonomous operation, and/or an acceptance or handover and provision of status information for the vehicle.

2. The system of claim 1, wherein the driver interface module is configured to provide at least one of the following:
setting up a connection to the operator when a radio infrastructure of the area has been detected,
performing a handover of the vehicle from the driver to the operator when a connection to the radio infrastructure has been set up or the operator interface module has made a request,
performing a separation from the operator only when the driver of the vehicle has taken responsibility for the vehicle, and/or
informing or advising the driver of the commercial vehicle of an actual delivery status, based on cargo restrictions, an availability of target cargo terminals and other parameters to help the driver to optimize a speed of transfer.

3. The system of claim 1, wherein the driver interface module is configured to provide information about at least one of the following:
an availability of known infrastructures of the area,
a connection status to an area infrastructure from the vehicle interface module and/or the driver interface module,
identification of a responsibility for the commercial vehicle,
a probable completion time for the action on the commercial vehicle,
an envisaged position of the commercial vehicle for returning responsibility for the commercial vehicle to the driver, and/or
a load and instructions for a successful delivery, about an intended delivery time and about an estimated delivery time.

4. The system of claim 1, wherein an employee with a personal interface module works in the restricted area, and wherein at least one of the interface modules is configured to set up a connection to the personal interface module to contact the employee.

5. The system of claim 4, wherein the personal interface module is configured to provide at least one of the following:
permitting the employee to start, interrupt or complete an action on an available commercial vehicle, by using a physical or software-implemented switch or button,
requesting more time to complete an action if the action is not complete-able in a predetermined time frame defined by the operator, by using a physical or software-implemented switch or button,
return of the commercial vehicle to the operator to initiate further autonomous actions,
receiving/sending messages from/to further subscribers connected to an area infrastructure,
allowing tracking of cargo parts, when the personal interface module is integrated into an operator system, using an individual cargo identification, and/or
uploading of cargo information to the operator of the restricted area.

6. The system of claim 1, wherein the personal interface module is configured to provide information about at least one of the following:
a list of employees available for an action, who perform an action or have completed an action,
target times for each vehicle on which actions are being performed,
about a connection state to an area infrastructure, wherein the connection state is provided to the vehicle interface module and/or to the driver interface module, and/or load to be loaded onto or unloaded from the vehicle, with an indication of a source, a destination and/or of special instructions.

7. The system of claim 1, wherein the operator interface module is configured to provide at least one of the following:
providing connections to the commercial vehicle, the driver interface module and/or the personal interface module,
permitting or performing a manual or automatic handover of responsibility for the commercial vehicle,
allowing a manual definition or a performance of an automatic definition of destinations for the autonomous commercial vehicle,
allowing download of cartographic data of the restricted area and production or download of an optimum routing to destinations for an autonomously driving commercial vehicle,
setting of a manual target time or production of an automatic target time for at least one condition of the action on the vehicle,
allowing manual or automatic starting and ending of actions for the commercial vehicle,
handling information obtained from the personal interface module of an employee to update a vehicle state and an elapsed and a remaining period for each vehicle in the restricted area,
transferring a manual or automatic handover of responsibility for the commercial vehicle to the driver on a request from the driver, and/or
permitting sending and receiving of messages from subscribers connected to an area infrastructure.

8. The system of claim 1, wherein the operator interface module is configured to provide information about at least one of the following:
a connection state of each vehicle within the restricted area,
an operating state of each vehicle in the restricted area,
a position and direction of each vehicle on a graphical map of the restricted area,
sensor signals transmitted by the vehicle that relate to an overview and/or a front view and/or from another perspective,
a series or order of destinations for each vehicle,
an elapsed and a probably remaining time and a finishing time at a destination for an action for the vehicle in the restricted area, and/or
an actual cargo of each directly or indirectly controlled vehicle.

9. The system of claim 1, further comprising:
a sharing device to share information about a cargo that has been loaded or unloaded with other restricted areas or to exchange said information with another cargo management system via further interfaces.

10. The system of claim 1, wherein the driver interface module is integrated with global navigation software to allow continuous renewal of the probable delivery time for cargo.

11. The system of claim 1, wherein the driver interface module is configured to perform an Internet-based communication with target cargo terminals while the vehicle with the cargo is moving to achieve optimization for the flow of cargo at the target cargo terminals.

12. The system of claim 1, wherein the interface modules include at least one of the following components or are integrated therewith: a computer unit, a cellphone, a tablet, a mobile electronic device and a radio network unit configured to cover at least the restricted area.

13. A management system, comprising:
at least one system for operating an autonomously driving commercial vehicle in a restricted area, including:
a vehicle interface module to provide an interface for the vehicle, wherein the restricted area has an entrance, an exit and at least one destination where an action is performable on the commercial vehicle;
a driver interface module to provide a communication interface for a driver; and
an operator interface module to provide a communication interface for an operator of the restricted area;
wherein the vehicle interface module, the driver interface module and the operator interface module are configured to exchange information with one another,
wherein the driver interface module and the operator interface module are connected to one another via a network,
wherein the vehicle interface module, the driver interface module and the operator interface module are connected via the network to a personal interface module of an employee,
wherein connections are set up from each of the modules to the network, and wherein the connections are set up by a wireless, encrypted via at least one channel, communication among each of the modules,
wherein the driver interface module is configured to receive/send a message from/to further subscribers connected to an area infrastructure, and
wherein the driver interface module is configured to provide information about actions that have been performed during autonomous driving, a period in the restricted area, a period at the loading station or other destination traveled to by the commercial vehicle, a waiting time since loading finished, an error that occurred, a dangerous situation that occurred during autonomous operation, and/or an acceptance or handover and provision of status information for the vehicle;
a cargo management; and
an interface for a monitoring person;
wherein the management system is configured to provide at least one of the following:
automatically determining destinations, based on the precise flow of cargo and the location of a given cargo terminal, so as to optimize a time that a commercial vehicle spends at a cargo terminal, and/or
providing information on the interface so as to allow monitoring of the multiple restricted areas, including commercial vehicles autonomously operating therein, by the monitoring person.

14. A method for operating an autonomously driving commercial vehicle in a restricted area, the method comprising:
setting up a connection between a vehicle interface module, a driver interface module and an operator interface module of a system, wherein the system for operating an autonomously driving commercial vehicle in a restricted area, includes:
a vehicle interface module to provide an interface for the vehicle, wherein the restricted area has an entrance, an exit and at least one destination where an action is performable on the commercial vehicle;
the driver interface module to provide a communication interface for a driver; and the operator interface module to provide a communication interface for an operator of the restricted area;
wherein the vehicle interface module, the driver interface module and the operator interface module are configured to exchange information with one another,
wherein the driver interface module and the operator interface module are connected to one another via a network,
wherein the vehicle interface module, the driver interface module and the operator interface module are connected via the network to a personal interface module of an employee, and
wherein connections are set up from each of the modules to the network, and wherein the connections are set up by a wireless, encrypted via at least one channel, communication among each of the modules,
wherein the driver interface module is configured to receive/send a message from/to further subscribers connected to an area infrastructure, and
wherein the driver interface module is configured to provide information about actions that have been performed during autonomous driving, a period in the restricted area, a period at the loading station or other destination traveled to by the commercial vehicle, a waiting time since loading finished, an error that occurred, a dangerous situation that occurred during autonomous operation, and/or an
acceptance or handover and provision of status information for the vehicle;
performing at least one function or providing at least one piece of information by the driver interface module of the system, wherein the driver interface module is configured to provide at least one of the following:
setting up a connection to the operator when a radio infrastructure of the area has been detected,
performing a handover of the vehicle from the driver to the operator when a connection to the radio infrastructure has been set up or the operator interface module has made a request,
performing a separation from the operator only when the driver of the vehicle has taken responsibility for the vehicle,
informing or advising the driver of the commercial vehicle of an actual delivery status, based on cargo restrictions, an availability of target cargo terminals and other parameters to help the driver to optimize a speed of transfer, and/or
receiving/sending a message from/to further subscribers connected to an area infrastructure;
performing at least one function or providing at least one piece of information by the operator interface module of the system, wherein the operator interface module is configured to provide information about at least one of the following:
a connection state of each vehicle within the restricted area,
an operating state of each vehicle in the restricted area,
a position and direction of each vehicle on a graphical map of the restricted area,
sensor signals transmitted by the vehicle that relate to an overview and/or a front view and/or from another perspective,
a series or order of destinations for each vehicle,
an elapsed and a probably remaining time and a finishing time at a destination for an action for the vehicle in the restricted area, and/or
an actual cargo of each directly or indirectly controlled vehicle.

15. A non-transitory computer readable medium having a computer program, which is executable by a processor, comprising:
a program code arrangement having program code for operating an autonomously driving commercial vehicle in a restricted area, by performing the following:
setting up a connection between a vehicle interface module, a driver interface module and an operator interface module of a system, wherein the system for operating an autonomously driving commercial vehicle in a restricted area, includes:
a vehicle interface module to provide an interface for the vehicle, wherein the restricted area has an entrance, an exit and at least one destination where an action is performable on the commercial vehicle;
the driver interface module to provide a communication interface for a driver; and
the operator interface module to provide a communication interface for an operator of the restricted area;
wherein the vehicle interface module, the driver interface module and the operator interface module are configured to exchange information with one another,
wherein the driver interface module and the operator interface module are connected to one another via a network,
wherein the vehicle interface module, the driver interface module and the operator interface module are connected via the network to a personal interface module of an employee, and
wherein connections are set up from each of the modules to the network, and wherein the connections are set up by a wireless, encrypted via at least one channel, communication among each of the modules,
wherein the driver interface module is configured to receive/send a message from/to further subscribers connected to an area infrastructure, and
wherein the driver interface module is configured to provide information about actions that have been performed during autonomous driving, a period in the restricted area, a period at the loading station or other destination traveled to by the commercial vehicle, a waiting time since loading finished, an error that occurred, a dangerous situation that occurred during autonomous operation, and/or an acceptance or handover and provision of status information for the vehicle;
performing at least one function or providing at least one piece of information by the driver interface module of the system, wherein the driver interface module is configured to provide at least one of the following:
setting up a connection to the operator when a radio infrastructure of the area has been detected,
performing a handover of the vehicle from the driver to the operator when a connection to the radio infrastructure has been set up or the operator interface module has made a request, performing a separation from the operator only when the driver of the vehicle has taken responsibility for the vehicle, informing or advising the driver of the commercial vehicle of an actual delivery status, based on cargo restrictions, an availability of target cargo terminals and other parameters to help the driver to optimize a speed of transfer, and/or receiving/sending a message from/to further subscribers connected to the area infrastructure;

performing at least one function or providing at least one piece of information by the operator interface module of the system, wherein the operator interface module is configured to provide information about at least one of the following:

a connection state of each vehicle within the restricted area, an operating state of each vehicle in the restricted area, a position and direction of each vehicle on a graphical map of the restricted area, sensor signals transmitted by the vehicle that relate to an overview and/or a front view and/or from another perspective, a series or order of destinations for each vehicle, an elapsed and a probably remaining time and a finishing time at a destination for an action for the vehicle in the restricted area, and/or an actual cargo of each directly or indirectly controlled vehicle.

* * * * *